United States Patent [19]
Hornschu et al.

[11] 4,080,042
[45] Mar. 21, 1978

[54] COLLAPSIBLE BINOCULAR TELESCOPE WITH ADJUSTABLE INTERNAL FOCUSING

[75] Inventors: Joachim Hornschu, Oberkochen; Artur Jung, Heidenheim (Brenz), both of Germany

[73] Assignee: Carl Zeiss-Stiftung, Oberkochen, Germany

[21] Appl. No.: 783,742

[22] Filed: Apr. 1, 1977

Related U.S. Application Data

[60] Division of Ser. No. 620,391, Oct. 7, 1975, abandoned, which is a continuation of Ser. No. 376,896, Jul. 5, 1973, abandoned.

[30] Foreign Application Priority Data

Jul. 6, 1972   Germany .............................. 2233055

[51] Int. Cl.² .......................... G02B 23/00; G02B 7/06
[52] U.S. Cl. ........................................ 350/36; 350/47; 350/76
[58] Field of Search ................................... 350/74–77, 350/70, 36, 46, 47

[56] References Cited

U.S. PATENT DOCUMENTS

| 1,338,241 | 4/1920 | Meling's | 350/77 |
| 1,428,478 | 9/1922 | Dunne | 350/75 |
| 2,811,895 | 11/1957 | Jensen | 350/76 |
| 3,484,149 | 12/1969 | Becker et al. | 350/77 |

Primary Examiner—Jon W. Henry
Attorney, Agent, or Firm—Hopgood, Calimafde, Kalil, Blaustein & Lieberman

[57] ABSTRACT

The invention contemplates an improved binocular telescope construction of the variety wherein a bridge provides articulated connection of the two telescope systems, so that by folding at least one of these articulated systems back against a side of the bridge, the instrument may be compacted when not in use. The invention is particularly concerned with provision of a single focusing drive for the focusing optical elements of both telescope systems, the drive being operative regardless of the extent of articulated expansion or contraction of the bridge-connected systems. The invention also features provision of such focusing by movement of optical elements contained within the overall telescope-housing length, so that such length does not change in the course of focusing. Various embodiments are described.

8 Claims, 11 Drawing Figures

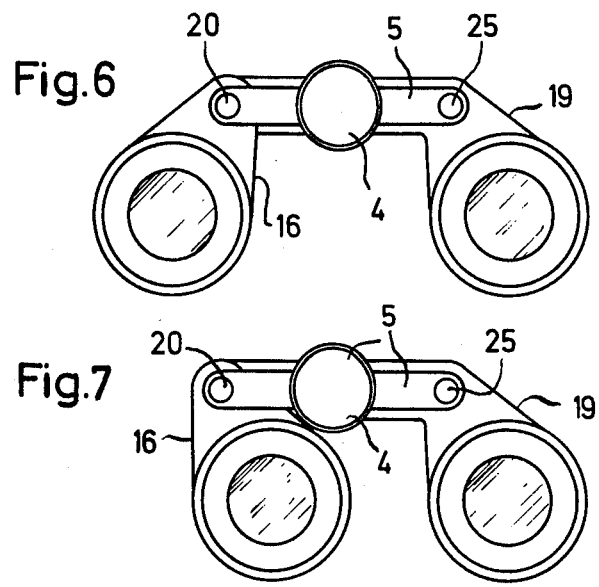
Fig.6
Fig.7
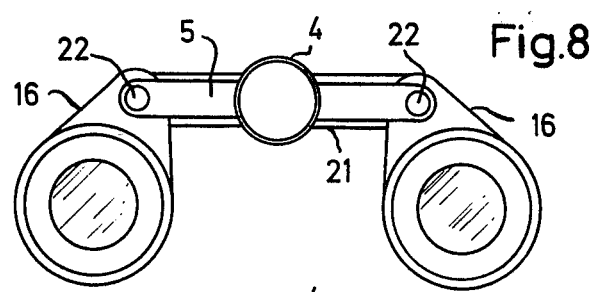
Fig.8
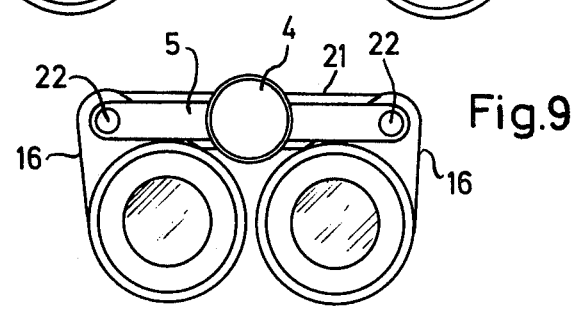
Fig.9

COLLAPSIBLE BINOCULAR TELESCOPE WITH ADJUSTABLE INTERNAL FOCUSING

This application is a division of copending application, Ser. No. 620,391, filed Oct. 7, 1975, said copending application being a continuation of original application Ser. No. 376,896, filed July 5, 1973 (now abandoned).

This invention relates to a binocular telescope with an articulated connecting bridge between the two individual telescopes, to enable selective adjustment, for use conditions and for compact storage.

Binocular telescopes with adjustable use and storage (packing) features have long been known. They have been devised in order to comply with the need for small handy pocket-size telescopes which in their packed condition have minimum space requirements.

Various solutions for the manufacture of a packing condition of small space requirement have become known. Thus, in German Pat. No. 230,064 a binocular telescope has been disclosed, involving telescopes which are rotatably connected with a frame-like center piece such that they can be fitted completely in the frame. In British Pat. No. 178,415, two individual telescopes are arranged for pivotal movement about two parallel axes which are disposed in the plane of a plate which connects the individual telescopes, and the individual telescopes can be pivoted either together to the same side of the connecting plate or else individually to the front and rear side of the plate. Austrian Pat. No. 286,672 discloses a binocular field glass having a double-articulated connecting bridge between two individual telescopes, offering the possibility of a Z-shaped collapse of the field glass within an unusually small space requirement, while simultaneously having a precise parallel position of the articulation axes. Also, binocular field glasses with a single articulated bridge between two individual telescopes, as shown in Austrian Pat. No. 297,364, have a handy form in their packed condition, the rotatably supported telescope being articulated to the bridge which is fixed to the other telescope. All such telescopic, pivotably, or collapsible binocular telescopes, however, suffer from the shortcoming that focusing must be effected individually at each of the eyepieces or at each of the objectives.

In addition, pivotable binocular telescopes with a drive button for the common focusing of two individual telescopes are known from French Pat. No. 450,592 as well as from the U.S. Pat. No. 1,428,478; however, the focusing disclosed in these patents suffers from the shortcoming that it is connected with a change in the longitudinal dimension of the telescope. And the disclosed embodiments of these patents are inherently insufficient with respect to sealability and are very expensive and complicated regarding their mechanical design.

It is an object of the invention to provide an improved articulated binocular-telescope construction which avoids shortcomings of prior devices.

It is a specific object of this invention to provide a binocular telescope requiring minimum space in its packed condition and providing common focusing of the two individual telescopes, in such manner that no change in volume of the telescope is involved by reason of focusing adjustment.

The invention achieves these objects by providing optical systems wherein the optical parts used for focusing each telescope are contained within the respective telescope tubes, being mounted for coupled axial adjustment by means of an external drive mechanism. The drive mechanism imparts axial displacement to the mount for each focusing element, and a longitudinal guide for each focusing element assures correct optical alignment regardless of the adjusted condition of the binoculars. In a preferred embodiment, the axially movable focusing mount includes an offset or control arm with a boss slidably guided by the pin or shaft by which the bridge is articulated to the particular telescope tube, and an elastic cuff or sleeve is used to seal the drive connection to the mount, where it extends through an opening in the telescope housing.

In manufacture of the binocular telescope, it is advantageous to equip the eyepieces by means of invertible eye cups for spectacle wearers. Thus, correction of a visual defect at the telescope can be omitted; also, either both eyepieces or both objectives can be mounted non-adjustably, and for focusing either both objectives or both eyepieces can be moved together axially by means of a drive button.

Advantageously, plates of glass or transparent plastic may provide fixed closure of the housing in front of the objectives, thereby protecting the objectives without limiting their axial focusing movement.

Coupled focusing of the two telescopes can be effected via a central drive, offset to one side of the objective or the eyepiece, the central drive to each focusing mount including a connection comprising a member mounted on the associated articulating pin or shaft.

It is also possible to effect common focusing via a drive button which is mounted on the articulating pin for one telescope, the focusing drive to the other telescope being by way of a member mounted on the articulating pin for said other telescope.

Of course, it is also possible to correct a visual defect of non-spectacle wearers by adapting an eyepiece or an objective for an individual adjustment.

This invention further permits the objectives and eyepieces provided with invertible eye cups to be mounted non-adjustably, all focusing being accomplished with a focusing lens axially movable between the eyepiece and the objective.

The advantages obtained by the invention particularly reside in provision of a collapsible binocular telescope, with minimum space requirement in a packed condition; the common focusing of the two paths of rays provides a high degree of comfort and ease of handling.

The binocular telescope of the invention thus permits construction of a binocular telescope of high optical capability, while requiring smallest space, in that the hitherto conventional individual eyepiece focus is replaced by extremely compact focusing mechanism whereby the comfort and ease of use may approach that of much larger binocular telescopes.

A few illustrative embodiments of this invention will now be described more fully with reference to the accompanying drawings, in which:

FIG. 6 is an end elevation similar to FIG. 2, to illustrate a modified binocular telescope having a single-articulated connecting bridge and a central drive for common focusing of the two paths of rays;

FIG. 7 is a view of the telescope of FIG. 6, in packed condition;

FIG. 8 is an end elevation similar to FIGS. 2 and 6, to illustrate another modified binocular telescope with a double-articulated rigid connecting bridge and a central drive for common focusing of the two paths of rays;

FIG. 9 is a view of the telescope of FIG. 8, in packed condition;

Figures 10, 11:
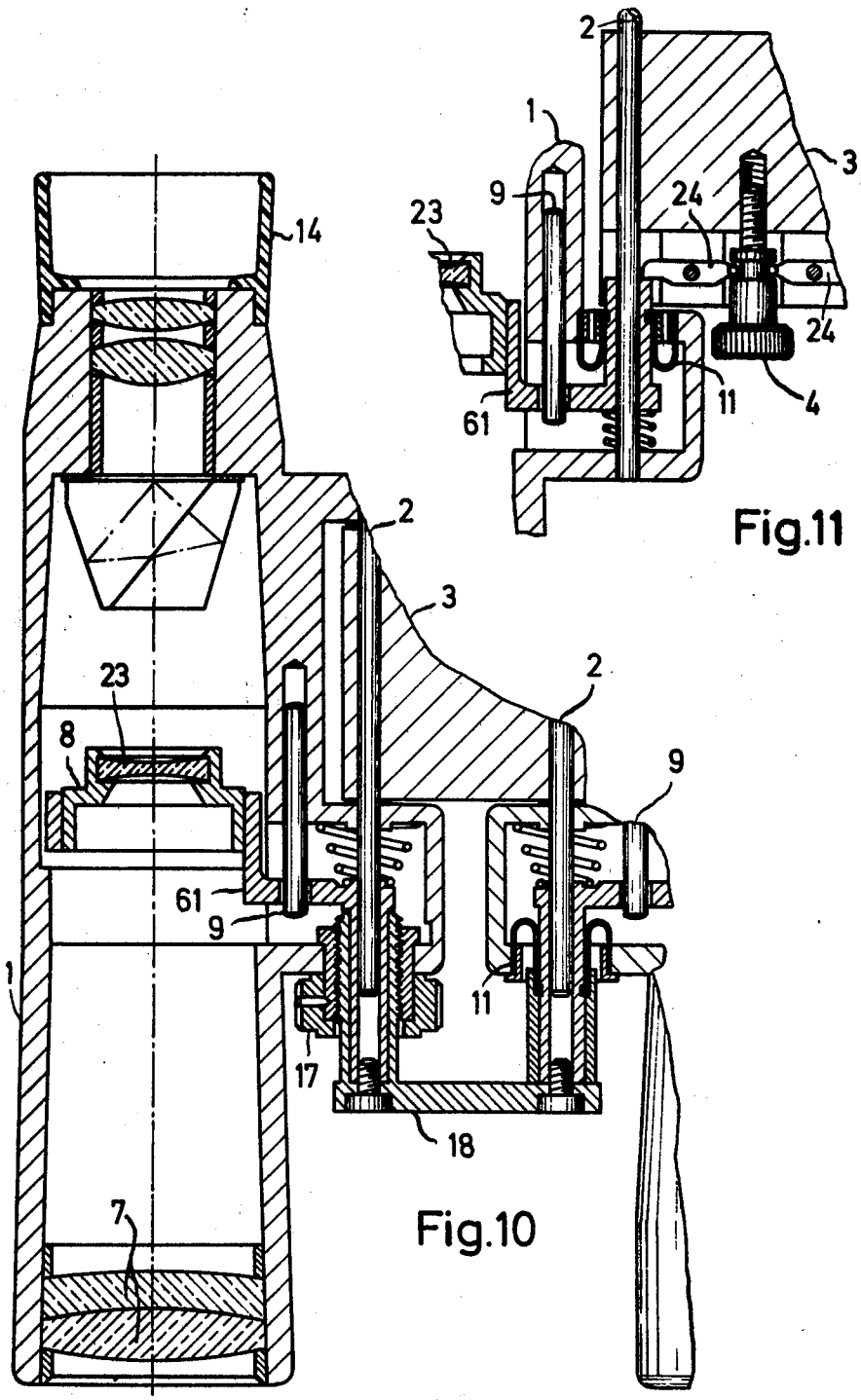

FIG. 10 is an enlarged fragmentary longitudinal section through a binocular telescope with a double-articulated connecting bridge and with an eccentrically located drive button for focusing displacement of a focusing lens; and FIG. 11 is a fragmentary section through a binocular telescope with a double-articulated connecting bridge and with a rocker-arm connection to translate drive button action into focusing displacement.

Figure 1:
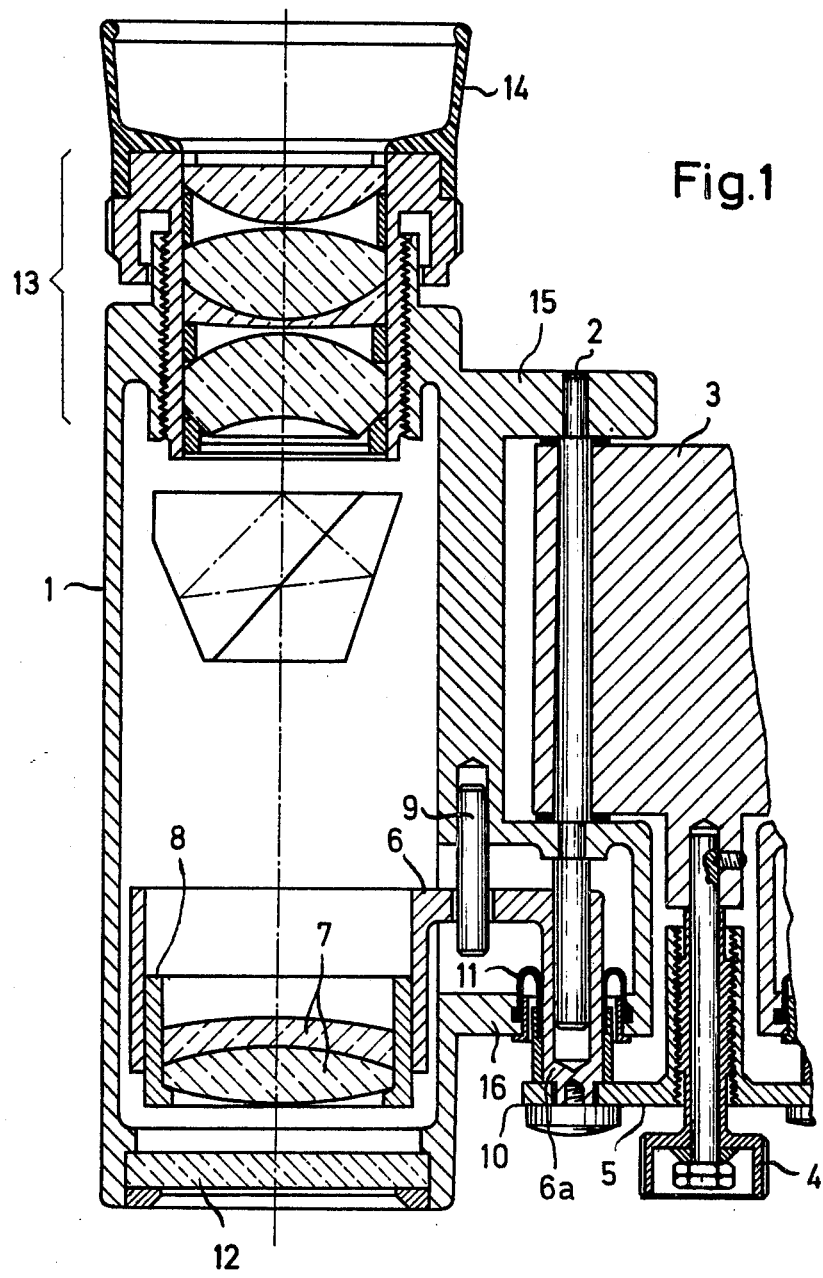
FIG. 1 is a fragmentary longitudinal sectional view through a binocular telescope with a double-articulated collapsible connecting bridge and with central-drive focusing mechanism of the invention.

In FIG. 1, reference numeral 1 designates the telescope housing, and since the optical and mechanical designs of both individual telescopes in this embodiment are identical as far as to the central drive, only the left telescope half has been illustrated. Reference numeral 2 designates the articulating axis or pin of the connecting bridge 3, serving the left telescope half. The drive button 4 acts, via a connection or yoke member 5, to axially drive a focusing mounting 6 for the focusing objective 7, an offset arm of the mount 6 being guided by the articulation pin 2. The mounting 6 consists of a first cylindrical annular portion surrounding the objective mount 8 and a second cylindrical annular portion 6a surrounding the articulating pin 2, as well as an off-setting or connection arm between these two cylindrical portions. A longitudinal guide element or pin 9 is fixed to housing 1 and has sliding engagement with a guide hole in the connection arm of mounting 6, thereby stabilizing the objective 7 on the optical axis of the telescope. The annular portion 6a, slidable on the end of articulation pin 2, is also rotatably engaged to yoke 5, at the bolted reduced end connection 10. Reference numeral 11 designates a flexible elastomeric sleeve or cuff which effectively seals off the housing 1 at the opening through which annular portion 6a passes and is adjustably displaced; cuff 11 will be understood to comprise flexibly connected inner and outer concentric ends, respectively secured to the portion 6a and to the housing opening therefor. The axially adjustable objective 7 is further sealed by a transparent plane-parallel plate 12, suitably fixed to a window opening in the housing 1. In the embodiment of the invention illustrated in FIG. 1, the eyepiece 13 is adjustable and is equipped with an elastomeric distance cuff 14 for spectacle wearers. Finally, reference numerals 15 and 16 designate projections on the housing tube, for use as bearings for pin 2 of the double-articulated bridge connection.

Figure 2:
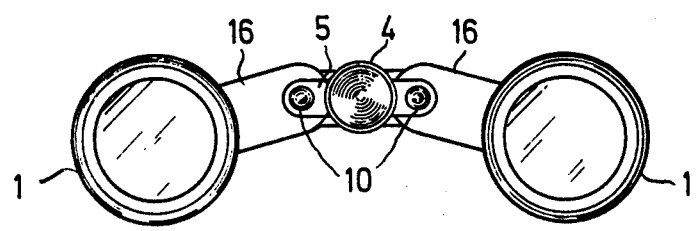
FIG. 2 is an end elevation of the binocular telescope of FIG. 1, in readiness for use, and taken from the objectives end of the telescope.
Figure 3:
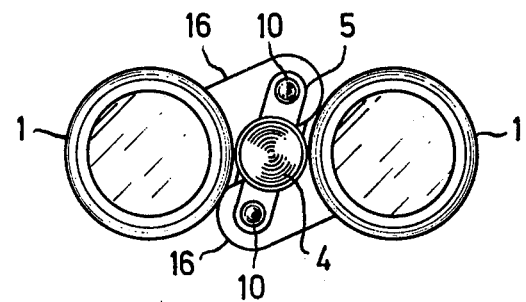
FIG. 3 is a view similar to FIG. 2, in folded or packed condition.

FIGS. 2 and 3 respectively show the binoculars of FIG. 1 when spread, in readiness for use, and when packed, for pocket or other storage.

Figure 4:
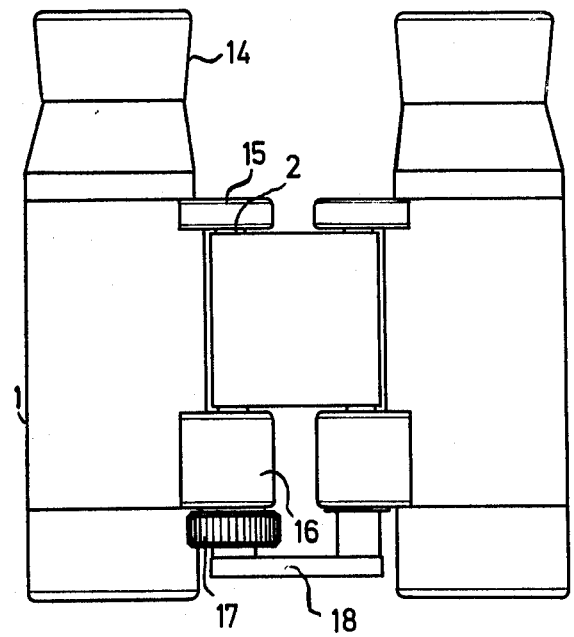
FIG. 4 is a plan view of a modified binocular telescope with double-articulated connecting bridge, wherein a drive button is arranged eccentrically on one of the articulating axes, for common focusing of the two paths of rays.
Figure 5:
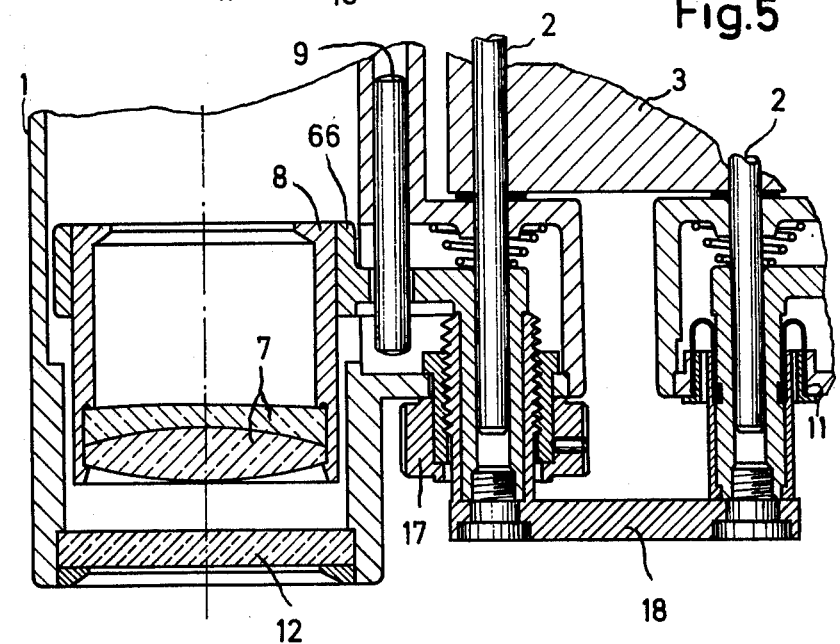
FIG. 5 is an enlarged fragmentary longitudinal section through the telescope of FIG. 4, to show detail of the focusing mechanism.

Another embodiment of this invention is illustrated in FIGS. 4 and 5, the same reference numbers being used for parts corresponding to those already described. The drive button 17 for common focusing of the two telescopes is mounted eccentrically, namely on the axis of the articulation pin 2 of the left telescope, the driven element of the button drive mechanism being connected with the right telescope via a connection member or yoke 18. The axially movable mounting for the objective used for focusing has dimensions slightly different from those of FIG. 1 and is therefore referenced 66. Compression springs preload the focusing movements of both members 66, producing smooth adjustment action, free of axial play. The eyepieces of this embodiment may be both non-adjustable and equipped with invertible eye cups for spectacle wearers.

FIGS. 6 and 7 respectively show another embodiment for the spread condition, in readiness for use, and in the collapsed or packed condition. This embodiment is a collapsible binocular telescope with a single-articulated connecting bridge 19, and a single central focusing drive button is again referenced 4. The mounting for axial movement of the focusing element (e.g., objective element) for the left telescope is guided on the articulation axis alignment 20 and for the right telescope on the shank of a guide bolt 25 carried by bridge 19. The single-articulated bridge 19 which connects the two telescopes is shown with a generally triangular adapting section at its fixed connection to the housing for the right-hand telescope; in appearance, this triangular adapting section preferably matches the shape of the generally triangular adapting section 16 forming part of the left-hand telescope housing, which is articulated at 20 to the bridge 19.

In the style of FIGS. 6 and 7, FIGS. 8 and 9 illustrate another embodiment involving a binocular telescope with an elongate double-articulated rigid connecting bridge 21 between the two telescopes and with a central drive 4 for common focusing of the two paths of rays. The more extensive nature of the bridge (effectively at least twice the hingeaxis offset of each telescope from its optical axis) enables folding of both telescopes to the same side of bridge 21, as shown in FIG. 9. The axially movable focusing mountings may be guided and driven in the manner described for the longitudinal section of FIG. 1, so that further showing of mechanical assembly is not necessary for the embodiment of FIGS. 8 and 9. It will also be evident that detailed showing is not required for embodiments in which the eyepieces are used for focusing; their construction results from the various examples shown in the present disclosure, upon reversal of objective and eyepiece elements in both telescopes.

In the embodiment of FIG. 10, each telescope incorporates a separate focusing lens 23, axially movable between eyepiece and objective elements. However, the mounting 61 for the focusing lens 23 and the mechanism by which axial movement is transmitted from the drive button 17 are similar to what has been shown for the mounting 66 in FIG. 5. Objectives and eyepieces in this embodiment are mounted fixedly and unmovably; otherwise, the mechanical assembly corresponds to that shown in preceding embodiments.

FIG. 11 illustrates a variant of the embodiment shown in FIG. 10. Axial focusing-element movement is transmitted to the focusing mounting 61 via rocker-arm means 24, pivotally referenced to the connecting bridge 3 and deriving rocker-arm movement from threaded advance of the drive button 4 into the center of bridge 3.

What is claimed is:

1. A binocular instrument comprising two separate individual telescope housings each having a tubular passage with optical elements on a telescope axis extending through its associated passage, each housing including first and second radially offset fixed hinge arms at the same angular location and in substantial axially spaced relation, a housing-connection bridge having relatively thin and substantially flat laterally extending ends, each such bridge end being rigid and axially located by and between the fixed arms of a different one of said housings, first hinge means connecting a first bridge end to both fixed hinge arms of one telescope housing and on an axis parallel to the associated telescope axis, second hinge means connecting the other bridge end to both fixed hinge arms of the other telescope housing and on an axis parallel to the associated telescope axis, said bridge retaining the respective axes of both hinge means in spaced parallel relation, a focusing optical element and a support therefor movably carried by each telescope housing, an actuation bridge adjustably positioned longitudinally beyond corresponding first hinge arms and transversely spanning the axes of said first and second hinge means and including guide means limiting actuation bridge displacement to purely longitudinal motion with respect to said housing-connection bridge, means including separate hinged-element connections from said actuation bridge to each one of said optical element supports for longitudinally moving the same in unison via said actuation bridge, means including at least one guide coacting between each focusing-element support and its associated telescope housing on an axis spaced from and parallel to the associated hinge-element connection for longitudinally guided positioning of said focusing element along the associated telescope axis, each said hinged-element connection being on the axis of a different one of said first and second hinge means, and a single adjustment-control mechanism for selectively adjusting the longitudinal position of said adjustment bridge with respect to said housings and housing-connection bridge.

2. The instrument of claim 1, wherein separate transparent means close the axial ends of each of said telescope housings, and wherein the focusing optical element in each telescope housing is movable in the longitudinal space between said closed ends.

3. The instrument of claim 2, in which the transparent means closing one end of each telescope housing is an optical element.

4. The instrument of claim 1, in which said housing-connection bridge is a one-piece structure insofar as it provides hinge-connection to the respective telescope housings.

5. The instrument of claim 3, in which for each telescope housing one of said optical elements is an objective and the other is an eyepiece.

6. The instrument of claim 3, in which for each telescope housing the respective axial ends are closed by eyepiece and objective elements.

7. The instrument of claim 3, in which the transparent means closing the other end of each telescope housing is a plane-parallel element.

8. The instrument of claim 1, in which said adjustment-control mechanism comprises a single knob-operated threaded mechanism on an axis parallel to said hinge axes and interconnecting said bridges.

* * * * *